United States Patent [19]
Katsma

[11] Patent Number: 5,210,914
[45] Date of Patent: May 18, 1993

[54] AUTOMATICALLY CLOSING CARABINER

[76] Inventor: Robert W. Katsma, 615 Scenic View Dr., College Place, Wash. 99324

[21] Appl. No.: 876,960

[22] Filed: Apr. 30, 1992

[51] Int. Cl.⁵ .............................. A63B 29/00
[52] U.S. Cl. .................. 24/573.5; 24/598.2; 24/599.6; 24/600.3; 24/599.7
[58] Field of Search ............. 24/599.4, 599.6, 599.7, 24/600.3, 573.5, 598.2

[56] References Cited
U.S. PATENT DOCUMENTS

| | | | |
|---|---|---|---|
| 184,709 | 11/1876 | Hames | 24/600.3 |
| 1,310,548 | 7/1919 | Sandstrom | 24/600.3 |
| 1,409,068 | 3/1922 | Simpson | 24/600.3 X |
| 4,802,264 | 2/1989 | Isenhart . | |
| 5,005,266 | 4/1991 | Fister et al. . | |

*Primary Examiner*—James R. Brittain

[57] ABSTRACT

A carabiner that has a gate that will be held open when moved past the three-quarters-open position. The gate can be closed by pulling down on the carabiner against the force from a connecting strap.

18 Claims, 3 Drawing Sheets 5,210,914

AUTOMATICALLY CLOSING CARABINER

FIELD OF THE INVENTION

This invention relates to carabiners, specifically to carabiners that are used in combination with ropes by mountaineers or climbers to ensure safety.

DESCRIPTION OF THE PRIOR ART

For safety in case of a fall, climbers attach a rope to themselves and have a partner who is secure in position to hold the rope. Often the climber is above the person holding the rope. Therefore, the climber has to attach the rope to the mountain so that the rope is free to move with the climber, but the rope must hold the climber through the action of the partner in case of a fall. The device that is used to make the connection between the rope and another element that is attached directly to the mountain is a carabiner. A carabiner is basically a C-shaped element with a gate bridging the opening to make a closed connector.

Because of the time required to attach some element directly to the mountain and then make the connection to the rope with a carabiner the climber has to be in a secure position. With climbers doing harder routes, the positions of the climbers are less secure, and attaching their rope to the mountain needs to be as efficient as possible. In some cases, the element that is attached directly to the mountain and the accompanying carabiner are in place before the climber climbs, and it is left for the climber to simply attach the rope to the carabiner.

In an effort to make the process of attaching the rope to the carabiner as easy as possible, Fister and Grosset describes a self-closing carabiner in U.S. Pat. No. 5,005,266 (Apr. 9, 1991). Although the invention is self-closing, it does suffer from at least two serious disadvantages:

(a) The gate of the carabiner is propped open by a tongue. Aligning the end of the tongue with the end of the gate during a climb is difficult. Therefore, the usefulness of Fister's carabiner is limited to applications where it can be prepared for use by propping the gate open before the climb.

(b) The tongue mechanism of the Fister and Grosset carabiner is located in the part of the carabiner that must take high pressure contact with the rope in the event that the climber falls. Therefore, the tongue is likely to get damaged. Even worse, a damaged tongue might damage the rope.

A solution to the above problem (a) is described by Isenhart in U.S. Pat. No. 4,802,264 (Feb. 7, 1989). Isenhart describes a gate that includes an over-center linkage to bias the gate toward either the open or closed position (away from the half-open position). The problem with this invention is that it is not self-closing.

OBJECTS AND ADVANTAGES OF THE INVENTION

Accordingly, several objects and advantages of the present invention are as follows:

(a) to provide a self-closing carabiner that is easy to use during a climb;

(b) to provide a self-closing carabiner that is not prone to damage;

(c) to provide a self-closing carabiner that has no increased risk of damaging the rope.

Still further objects and advantages will become apparent from a consideration of the ensuing description and drawings.

Reference Numerals In Drawings

Figure 1:
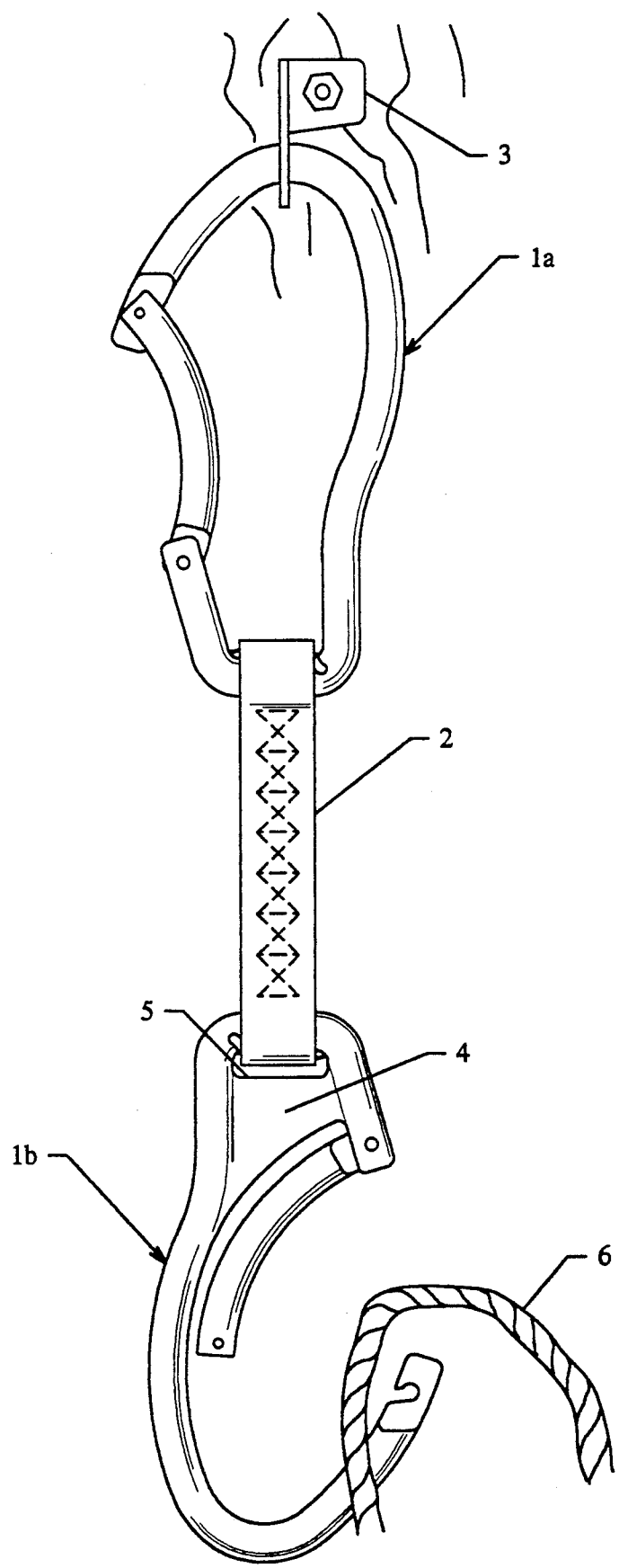
FIG. 1 is a side view of two carabiners of the present invention connected by a strap.
Figure 2:
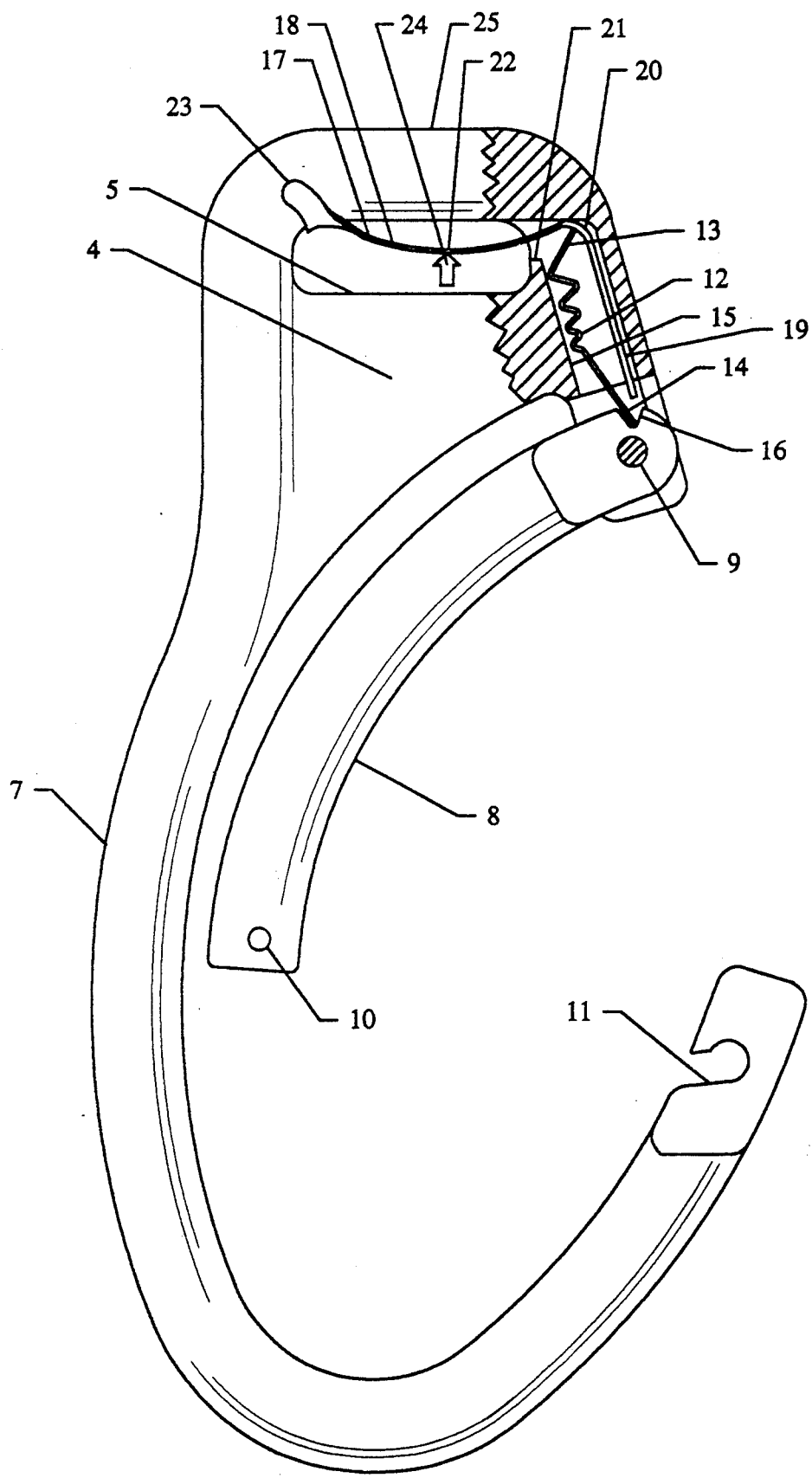
FIG. 2 is a side view of a preferred embodiment of the present invention that shows part of the body of the carabiner sectioned to expose the gate-controlling mechanism.
Figure 3:
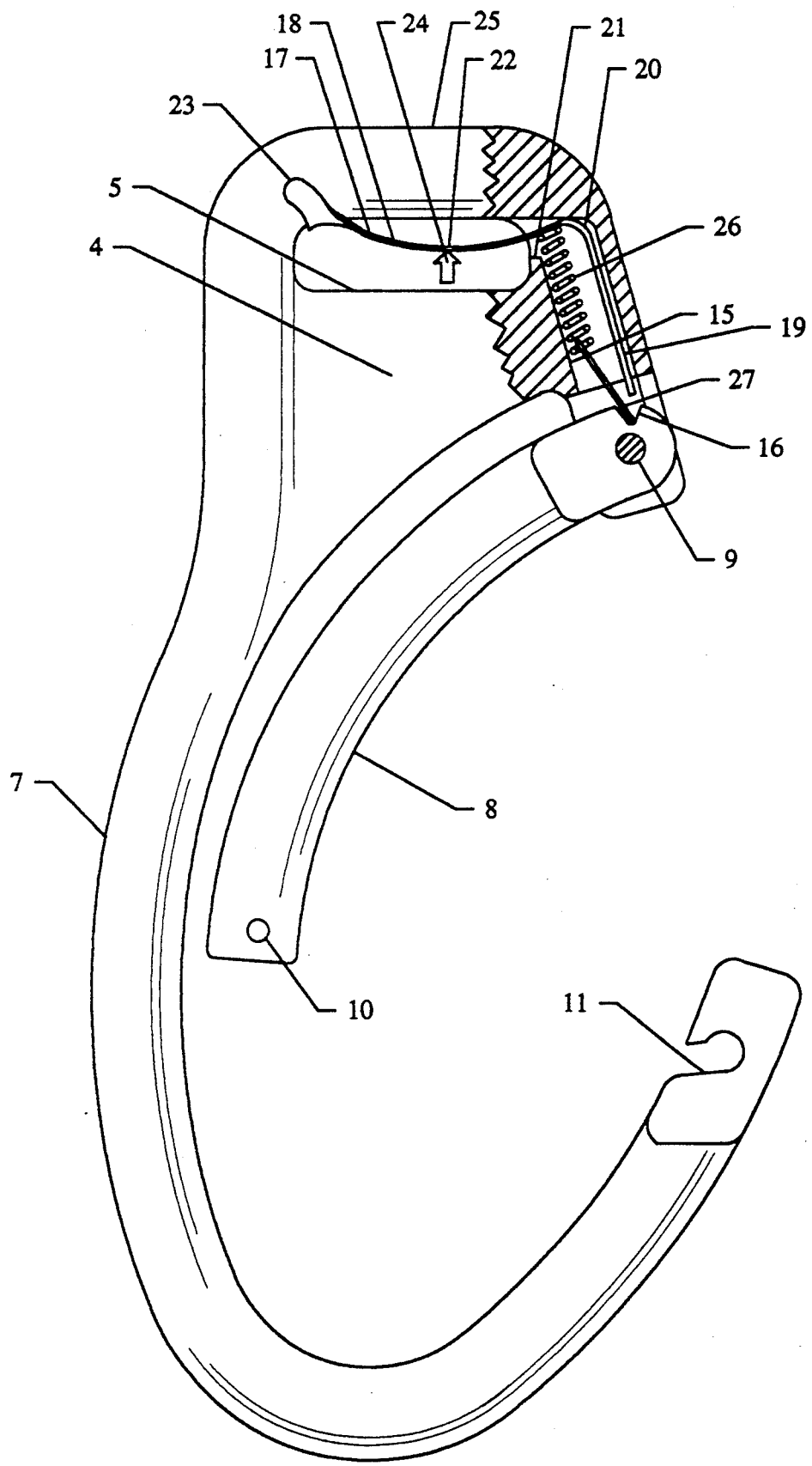
FIG. 3 is a side view of a another embodiment of the present invention that shows part of the body of the carabiner sectioned to expose the gate-controlling mechanism. The coil spring is also shown sectioned; because of the small size, however, hatch lines were not used.

FIG. 1
1a top carabiner
1b bottom carabiner
2 strap
3 anchor
4 web
5 strap slot
6 rope FIG. 2
4 web
5 strap slot
6 not shown in this figure
7 body
8 gate
9 pivot
10 pin
11 notch
12 biasing spring
13 spring end
14 pawl end
15 axial bore
16 groove
17 spring-lever
18 strap leg
19 pawl leg
20 elbow
21 transverse bore
22 resilient region
23 saddle
24 arrow
25 strap segment FIG. 3
4 web
5 strap slot
6 not shown in this figure
7 body
8 gate
9 pivot
10 pin
11 notch
12 not used in this embodiment
13 not used in this embodiment
14 not used in this embodiment
15 axial bore
16 groove
17 spring-lever
18 strap leg
19 pawl leg
20 elbow
21 transverse bore 22 resilient region
23 saddle
24 arrow
25 strap segment
26 compression coil spring
27 pawl

DESCRIPTION OF THE INVENTION

Two embodiments of the carabiner of the present invention are illustrated in FIG. 1. A carabiner (1a) is shown connected by a strap (2) to a carabiner (1b) as is often the case in actual use. Because carabiner (1a) is connected to an anchor (3) in the rock and is not used with a rope, it is not necessary that carabiner (1a) have the self-closing feature of the present invention. For illustrative purposes, however, carabiner (1a) is shown as an embodiment of the present invention. Carabiner (1b) differs from carabiner (1a) in the addition of a web (4) that strengthens the carabiner and forms a strap slot (5). Carabiner (1b) is shown prepared for the entrance of a rope (6).

Carabiner (1b) is a preferred embodiment of the present invention, and it is illustrated in more detail in FIG. 2. For clarity, strap (2) is omitted in FIG. 2. The carabiner includes a body (7) that is generally C-shaped with a strap segment (25) that is approximately cylindrical and shifted distally in a continuous and smooth manner from the remainder of body (7). The body also includes web (4) joining the parts of the body on each side of strap segment (25). Web (4) in combination with strap segment (25) of body (7) forms strap slot (5) for strap (2). See FIG. 1 for strap (2). The opening of the carabiner is bridged by a gate (8) that is illustrated in the open position. Gate (8) rotates about a pivot (9) so that when the gate is closed, a pin (10) rests in a notch (11). The gate is biased toward the open or closed position (away from a three-fourths-open position) by an over-center linkage.

The over-center linkage comprises a biasing spring (12) made from flat wire, having a spring end (13) and a pawl end (14), that works in combination with gate (8). The biasing spring is confined within an axial bore (15) in body (7) as shown in section view. Pawl end (14) of the biasing spring is further located by a groove (16) in gate (8).

A spring-lever (17) is an L-shaped flat-wire element with a strap leg (18) and a pawl leg (19) joined by an elbow (20). Strap leg (18) extends adjacent to strap segment (25) of body (7), between strap (2) and the body, and through transverse bore (21) to axial bore (15). See FIG. 1 for strap (2). Pawl leg (19) extends in axial bore (15) adjacent and distal to biasing spring (12) nearly to the end of pawl end (14) but not interfering with gate (8). Spring-lever (17) is stiff except for a resilient region (22) located in the center region of strap leg (18). The spring-lever is held in position by axial bore (15) on the pawl leg and by a saddle (23) that conforms to the locally cylindrical cross-section of body (7). The spring-lever is additionally positioned by the force from the spring end (13) of the biasing spring.

Another embodiment is shown in FIG. 3. It is different in that biasing spring (12) of the preferred embodiment, FIG. 2, has been eliminated and replaced by two parts, a compression coil spring (26) and a pawl (27).

Operation of the Invention

Preferred embodiment, FIG. 2.

Gate (8) is pushed open by the user against the force of biasing spring (12). As the gate crosses over the approximately three-quarters-open position, groove (16) will cross over the center line between pivot (9) and biasing spring (12), and the gate will be forced to the open position by the biasing spring. It is now a simple matter for the climber to place the rope in the carabiner. To close the carabiner, the climber simply pulls down on the rope or carabiner to apply a load to the carabiner. The act of applying a load to the carabiner against the force from strap (2) will force strap leg (18) of spring-lever (17) toward strap segment (25) of body (7), as shown by an arrow (24). The strap leg will bend in resilient region (22). This will cause pawl leg (19) of the spring-lever to rotate clockwise about elbow (20) and push pawl end (14) of the biasing spring to the left. Since the pawl end of the biasing spring is located in groove (16), gate (8) will be forced to rotate counter-clockwise against the force of biasing spring (12). But as groove (16) crosses over the center line between pivot (9) and biasing spring (12), the gate will be forced to the closed position by the biasing spring. It is clear that the user could manually move the gate toward the closed position, if for some reason applying a load to the carabiner was undesirable.

Another embodiment, FIG. 3.

This embodiment operates the same as the preferred embodiment. The only difference is that compression coil spring (26) and pawl (27) do the work that was done by biasing spring (12) in the preferred embodiment.

Summary, Ramifications, and Scope

Accordingly, the reader will see that this invention provides for an automatically closing carabiner that is easy to use. It is not necessary for the climber to align a prop to hold the gate open. The climber simply opens the gate past the three-quarters-open position, and the gate is held open. Closing the carabiner is a simple matter of applying a load to the carabiner against the force from a connecting strap. Furthermore, the closing linkage is in a protected place so that it is not prone to damage. And even more important, the closing linkage cannot damage the rope.

While my above description contains many specificities, these should not be construed as limitations on the scope of the invention, but rather as an exemplification of one preferred embodiment thereof. Other variations are possible. Also, this invention is not limited to use in climbing or mountaineering but may have application in other fields such as rescue operations. Accordingly, the scope of this invention should be determined not by the embodiment illustrated but by the appended claims and their legal equivalents.

Having described my invention, what I claim as new and desire to secure by Letters Patent is:

1. A carabiner comprising:
    a generally C-shaped body,
    a gate hinged at one end thereof to one end of said body, so as to be movable between open and closed positions, and said gate having an engagement means at its other end for engaging the second end of said body, to form a closed loop,
    a biasing means for biasing said gate and said body away from a partially open position, toward either a fully open or a fully closed position, and
    a load-activated gate-closing means to move said gate and said body from an open position toward a closed position a sufficient distance so that said biasing means reverses the direction of bias of said gate so as to bias said gate toward a fully closed position.

2. The carabiner of claim 1,
wherein said body has an axial bore in its hinged end and a transverse bore intersecting the blind end of said axial bore and extending inwards through said body, and
wherein said gate-closing means comprises a spring-lever that is generally L-shaped with a pawl leg and a strap leg, said pawl leg is located in said axial bore and extends near to but does not interfere with the hinge end of said gate, said strap leg passes through said transverse bore and extends adjacent to said body, with the middle section of said strap leg having a resilient region arching away from said body so as to allow said strap leg to be bent toward said body.

3. The carabiner of claim 2,
wherein said biasing means comprises a biasing spring having a pawl end and a spring end, said biasing spring is located in said axial bore to the strap leg side of said pawl leg, with said spring end contacting said strap leg and said pawl end resting in a notch in the hinge end of said gate.

4. The carabiner of claim 3 further including a strap,
wherein said strap encompasses said strap leg and said body in the region of said strap leg,
whereby said carabiner can be closed by applying a force to said carabiner that is opposed by a force from said strap.

5. The carabiber of claim 2,
wherein said biasing means comprises a compression coil spring located in said axial bore to the strap leg side of said pawl leg, and a pawl in engagement with said compression coil spring and protruding from said axial bore, with said compression coil spring bearing against said strap leg and said pawl resting in a notch in the hinge end of said gate.

6. The carabiner of claim 5 further including a strap,
wherein said strap encompasses said strap leg and said body in the region of said strap leg,
whereby said carabiner can be closed by applying a force to said carabiner that is opposed by a force from said strap.

7. A carabiner comprising:
a generally C-shaped body with a strap segment that is approximately cylindrical and shifted distally in a continuous and smooth manner from the remainder of said body,
a gate hinged at one end thereof to the end of said body nearest to said strap segment, so as to be movable between open and closed positions, and said gate having an engagement means at its other end for engaging the second end of said body, to form a closed loop,
a biasing means for biasing said gate and said body away from a partially open position, toward either a fully open or a fully closed position, and
a load-activated gate-closing means to move said gate and said body from an open position toward a closed position a sufficient distance so that said biasing means reverses the direction of bias of said gate so as to bias said gate toward a fully closed position.

8. The carabiner of claim 7,
wherein said body has an axial bore in its hinged end and a transverse bore intersecting the blind end of said axial bore and extending inwards through said body, approximately parallel and medial to said strap segment, and
wherein said gate-closing means comprises a spring-lever that is generally L-shaped with a pawl leg and a strap leg, said pawl leg is located in said axial bore and extends near to but does not interfere with the hinge end of said gate, said strap leg passes through said transverse bore and extends adjacent to said strap segment, with the middle section of said strap leg having a resilient region arching away from said strap segment so as to allow said strap leg to be bent toward said strap segment.

9. The carabiner of claim 8,
wherein said biasing means comprises a biasing spring having a pawl end and a spring end, said biasing spring is located in said axial bore to the strap leg side of said pawl leg, with said spring end contacting said strap leg and said pawl end resting in a notch in the hinge end of said gate.

10. The carabiner of claim 9 further including a strap,
wherein said strap encompasses said strap leg and said strap segment,
whereby said carabiner can be closed by applying a force to said carabiner that is opposed by a force from said strap.

11. The carabiner of claim 8,
wherein said biasing means comprises a compression coil spring located in said axial bore to the strap leg side of said pawl leg, and a pawl in engagement with said compression coil spring and protruding from said axial bore, with said compression coil spring bearing against said strap leg and said pawl resting in a notch in the hinge end of said gate.

12. The carabiner of claim 11 further including a strap,
wherein said strap encompasses said strap leg and said strap segment,
whereby said carabiner can be closed by applying a force to said carabiner that is opposed by a force from said strap.

13. A carabiner comprising:
a generally C-shaped body with a strap segment that is approximately cylindrical and shifted distally in a continuous and smooth manner from the remainder of said body, said body further includes a web joining the parts of said body on each side of said strap segment, said strap segment and said web form a strap slot,
a gate hinged at one end thereof to the end of said body nearest to said strap segment, so as to be movable between open and closed positions, and said gate having an engagement means at its other end for engaging the second end of said body, to form a closed loop,
a biasing means for biasing said gate and said body away from a partially open position, toward either a fully open or a fully closed position, and
a load-activated gate-closing means to move said gate and said body from an open position toward a closed position a sufficient distance so that said biasing means reverses the direction of bias of said gate so as to bias said gate toward a fully closed position.

14. The carabiner of claim 13, wherein said body has an axial bore in its hinged end and a transverse bore intersecting the blind end of said axial bore and extending inwards through said body, approximately parallel and medial to said strap segment, and wherein said gate-closing means comprises a spring-lever that is generally L-shaped with a pawl leg and a strap leg, said pawl leg is located in said axial bore and extends near to but does not interfere with the hinge end of said gate, said strap leg passes through said transverse bore and extends adjacent to said strap segment, with the middle section of said strap leg having a resilient region arching away from said strap segment so as to allow said strap leg to be bent toward said strap segment.

15. The carabiner of claim 14, wherein said biasing means comprises a biasing spring having a pawl end and a spring end, said biasing spring is located in said axial bore to the strap leg side of said pawl leg, with said spring end contacting said strap leg and said pawl end resting in a notch in the hinge end of said gate.

16. The carabiner of claim 15 further including a strap, wherein said strap encompasses said strap leg and said strap segment, whereby said carabiner can be closed by applying a force to said carabiner that is opposed by a force from said strap.

17. The carabiner of claim 14, wherein said biasing means comprises a compression coil spring located in said axial bore to the strap leg side of said pawl leg, and a pawl in engagement with said compression coil spring and protruding from said axial bore, with said compression coil spring bearing against said strap leg and said pawl resting in a notch in the hinge end of said gate.

18. The carabiner of claim 17 further including a strap, wherein said strap encompasses said strap leg and said strap segment, whereby said carabiner can be closed by applying a force to said carabiner that is opposed by a force from said strap.

* * * * *